(No Model.)

P. A. GLADWIN.
AUGER.

No. 248,854.

Patented Nov. 1, 1881.

WITNESSES
George V. Mallon
L. W. Williams

INVENTOR
Porter A. Gladwin
By his Atty.
Henry W. Williams

UNITED STATES PATENT OFFICE.

PORTER A. GLADWIN, OF BOSTON, MASSACHUSETTS.

AUGER.

SPECIFICATION forming part of Letters Patent No. 248,854, dated November 1, 1881.

Application filed June 8, 1881. (No model.)

*To all whom it may concern:*

Be it known that I, PORTER A. GLADWIN, of Boston, in the county of Suffolk and State of Massachusetts, have invented a new and useful Improvement in Augers and Gimlets, of which the following is a specification.

This improvement applies to augers, gimlets, bits, and similar wood-boring tools whose shanks are provided with twisted or spiral channels or grooves; and its object is to prevent the groove or channel in the screw or point (in which the auger or gimlet terminates) from being clogged or filled up.

The invention consists in an auger or gimlet provided with an extension groove or channel, extending from the channel in the shank downward in such a direction as to cross the thread of the terminal screw or point, thus clearing the channel of the terminal screw or point and preventing it from becoming clogged.

Figure 3:
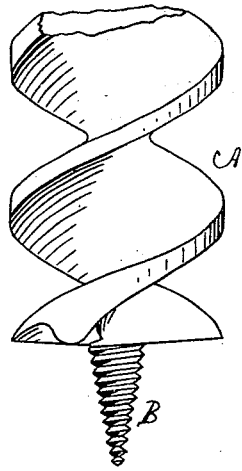
Figure 2:
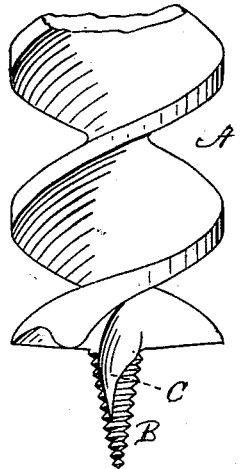
Figure 1:
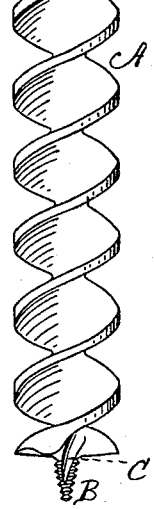

In the accompanying drawings, in which similar letters of reference indicate like parts, Figure 1 is an elevation of an auger-bit embodying my improvement. Fig. 2 is an enlarged view of a portion of the same. Fig. 3 is a view of a portion of an auger or bit constructed in the ordinary manner.

A is the shank, and B the screw or point.

In using augers constructed as shown in Fig. 3, it is found that the channel of the screw B is extremely liable to become clogged and filled up. I have therefore provided the groove or channel C, which extends downward from the lower ends of the channels of the shank A across the thread and channel of the screw B. These channels are so hollowed out as to have cutting-edges, and they enable the screw B to clear itself into the shank-channels and most effectually prevent clogging. Either one or two such channels may be used, as desired. The same principle is carried out in the construction of gimlets.

Figure 4:
Figure 4:
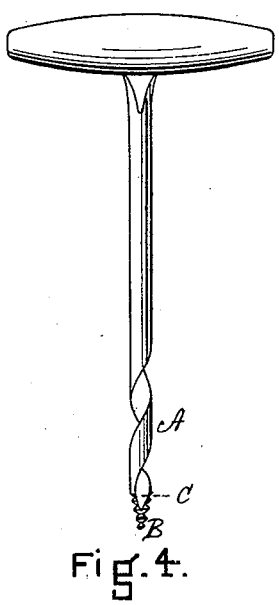
Figure 6:
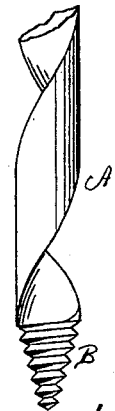
Figure 5:
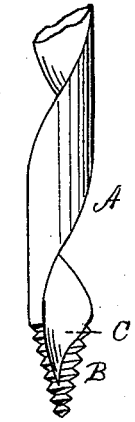

Fig. 4 is an elevation of a gimlet constructed with my improvement. Fig. 5 is an enlarged view of a portion of the same. Fig. 6 is a similar view constructed in the ordinary manner.

A is the shank. B is the screw or point, and C is the extension-channel connecting with the shank-channel, and crossing the thread of the screw B.

Gimlets are made with one or two channels. In the one illustrated there is but one—hence only one extension-channel. The result in a gimlet is the same as in an auger, the point or screw clearing itself into the shank-channel. Of course the channel C may extend any distance down, even to the lower end of the point B, if desired, thus obviating all danger of the auger refusing to draw into the wood on account of the clogging of the screw B, as is the case in augers constructed as shown in Fig. 3.

I am aware that there has been applied to the old-fashioned pod-gimlet, and perhaps to the pod-auger, an extension commencing at the lower end of the vertical pod, whose object is to prevent splitting of the wood. My invention is not applicable to pod augers and gimlets, and it differs from any pod-extension, inasmuch as while a pod-extension holds the chips in the pod and extension my twist-channel extension carries the chips up into the shank-channel, thus allowing the auger to be successfully used in boring very hard wood.

I am also aware that an ice-auger was patented June 10, 1873, in which the auger-channel was continued into the point, such point being cut off, and having no gimlet or screw point.

Having thus fully described my invention, what I claim, and desire to secure by Letters Patent, is—

An auger or gimlet for boring wood, provided with a gimlet-point and having a spiral shank-channel provided with the groove C, constructed as described, and extending from the lower terminus of the shank-channel downward across the thread of the screw B, and following the general direction of the said shank-channel toward the gimlet-point of said screw B, substantially as and for the purpose set forth.

PORTER A. GLADWIN.

Witnesses:
HENRY W. WILLIAMS,
GEORGE V. MALLON.